(12) United States Patent
Oliveri

(10) Patent No.: US 10,585,861 B2
(45) Date of Patent: Mar. 10, 2020

(54) OVERLAY-BASED FILE TAGGING USING VIRTUAL FILE SYSTEMS

(71) Applicant: Red Hat, Inc., Raleigh, NC (US)

(72) Inventor: Richard Oliveri, Warren, NJ (US)

(73) Assignee: Red Hat, Inc., Raleigh, NC (US)

( * ) Notice: Subject to any disclaimer, the term of this patent is extended or adjusted under 35 U.S.C. 154(b) by 625 days.

(21) Appl. No.: 15/042,622

(22) Filed: Feb. 12, 2016

(65) Prior Publication Data

US 2017/0235765 A1    Aug. 17, 2017

(51) Int. Cl.
 *G06F 16/188*    (2019.01)

(52) U.S. Cl.
 CPC .................... *G06F 16/196* (2019.01)

(58) Field of Classification Search
 None
 See application file for complete search history.

(56) References Cited

U.S. PATENT DOCUMENTS

| | | | |
|---|---|---|---|
| 5,603,019 A * | 2/1997 | Kish | G06F 17/30067 707/757 |
| 5,968,134 A * | 10/1999 | Putzolu | G06F 17/30067 707/E17.01 |
| 7,197,516 B1 | 3/2007 | Hipp et al. | |
| 7,451,196 B1 | 11/2008 | de Vries et al. | |
| 8,484,257 B2 | 7/2013 | Borthakur et al. | |
| 8,863,299 B2 | 10/2014 | Sharma et al. | |
| 9,058,334 B2 | 6/2015 | Hughes et al. | |
| 2009/0006713 A1 | 1/2009 | Royer et al. | |

OTHER PUBLICATIONS

Arif HD, linux terminal Tutorial 45 : How to Filter Output Is only show Files on Custom Month Oct. 17, 15, youtube.com, https://www.youtube.com/watch?v=nFDczCXXbBY.*
LS(1) 2009, linuxcommand.org, http://linuxcommand.org/lc3_man_pages/ls1.html.*
Dell Latitude D600 2004, Dell, https://www.dell.com/downloads/us/products/latit/d600_spec.pdf.*
The Authoritative Dictionary of IEEE Standards Terms 2000, IEEE, 7th ed., p. 561.*
Silberschatz et al., Operating System Concepts 2009, Wiley, 8th ed., pp. 444-446.*
Silberschatz et al., Operating System Concepts 2013, Wiley, 9th ed., pp. 526-528.*

(Continued)

*Primary Examiner* — Jason G Liao
(74) *Attorney, Agent, or Firm* — Lowenstein Sandler LLP

(57) ABSTRACT

Systems and methods for overlay-based file tagging using virtual file systems. An example method may include: receiving, from a file system client, a request to perform a file operation with respect to a file; identifying a part of the file name representing a mount point of a virtual file system associated with the file; identifying a memory pointer associated with the mount point; identifying, using the memory pointer, an instance of a class implementing the virtual file system; retrieving the metadata associated with a file using a memory data structure associated with the instance of the class, the memory data structure comprising a plurality of records, each record associating a file identifier with a metadata item; and performing the file operation using the metadata associated with the file.

20 Claims, 6 Drawing Sheets

(56) References Cited

OTHER PUBLICATIONS

IEEE Standard for Data Dictionaries for Intelligent Transportation Systems Jun. 26, 1999, IEEE Standards Coordinating Committee 32, 40 pages.*
Tweedie 1999, Red Hat Corp., https://elixir.bootlin.com/linux/v3.6/source/fs/ext3/ext3.h.*
Kleiman, Vnodes: An Architecture for Multiple File System Types in Sun UNIX 1986, USENIX, 10 pages.*
jm666 et al., Mountpoint from a filename—portable way Apr. 23, 2013, stackoverflow.com, Mountpoint from a filename—portable way.*
4.1 VNODE/VFS Architecture Summer 2004, Simon Frasure University, pp. 10-16.*
iSeries Architecture—Part 2 module 3 2008, IBM Corporation, 80 pages.*
Apache Commons VFS Changes Feb. 1, 2019, apache.org, http://commons.apache.org/proper/commons-vfs/changes-report.html.*
Interface FileObject [date unknown], apache.org, http://commons.apache.org/proper/commons-vfs//commons-vfs2/apidocs/org/apache/commons/vfs2/FileObject.html.*
Interface FileSystemManager [data unknown], apache.org, https://people.apache.org/~rgoers/commons-vfs/site/apidocs/org/apache/commons/vfs2/FileSystemManager.html#createVirtualFileSystem(org.apache.commons.vfs2.FileObject).*
Gooch et al., Overview of the Linux Virtual File System, Jun. 24, 2007, kernel.org, https://www.kernel.org/doc/Documentation/filesystems/vfs.txt.*
Webster's Encyclopedic Unabridged Dictionary of the English Language 1989, Gramercy Books, 1989 edition, p. 715.*
Naveen et al., Why is 'this' a pointer and not a reference? Mar. 14, 2009 14:37, stackoverflow.com, https://stackoverflow.com/questions/645994/why-is-this-a-pointer-and-not-a-reference.*
This class implements, captured Aug. 10, 2019 by USPTO, Google.com, https://www.google.com/search?ei=aAVPXf59ipbnAqaxhegO&q=%22this+class+implements%22&oq=%22this+class+implements%22&gs_l=psy-ab.3..0i22i30l7.5909.9500..10037 . . .0.0..0.80.1167.23...0...1..gws-wiz...0i71j0i131j0j0i70i255.Zn1mRyRF_fE&ved=0ahUKEwj.*
This class implements—interface, captured Aug. 10, 2019 by USPTO, https://www.google.com/search?ei=ZRhPXaTzNunR5gL_pm4DA&q=%22this+class+implements%22+-interface&oq=%22this+class+implements%22+-interface&gs_l=psy-ab.3...28265.30427..30569...0.0..0.62.458.11...0...1..gws-wiz...0i71j0i22i30.u8A3RGM1kKw&ved=0ah.*
Class VFSFileSystemManager Mar. 9, 2013, leisenfels.com, http://ftp.leisenfels.com/products/jarinfo/current/api/com/lf/commons/net/./VFSFileSystemManager.html.*
Costache, Stefania Victoria and Pintilei, Dan "HybFS: Adding Multiple Organizational Views Through a Virtual Overlay File System", Faculty of Automatic Control and Computers, Politehnica University of Bucharest, Bucharest, Romania, 6 Pages http://soaprj.googlecode.com/svn-history/r172/trunk/doc/hybfs.pdf (Last accessed Jan. 26, 2016).
"Configuring Metadata and Virtual File System Views", oracle.com, 22 Pages https://docs.oracle.com/cd/E19851-01/819-7555-10/schema.html (Last accessed Jan. 26, 2016).
"Filesystem in Userspace", Wiki MediaFileSystems, 6 Pages http://sourceforge.net/p/fuse/wiki/MediaFileSystems/ (Last accessed Jan. 26, 2016).
"The Libferris Virtual Filesystem", lwn.net/Articles, 2008, 5 Pages https://lwn.net/Articles/306860/.

* cited by examiner

OVERLAY-BASED FILE TAGGING USING VIRTUAL FILE SYSTEMS

TECHNICAL FIELD

The present disclosure is generally related to computer systems, and is more specifically related to virtual file systems.

BACKGROUND

A file system is a hierarchy of directories (represented by a directory tree) that may be employed to organize files on a computer system. In the Unix family of operating systems, the root directory located at the very top of this hierarchy contains other directories, inclusive of their respective subdirectories and files.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
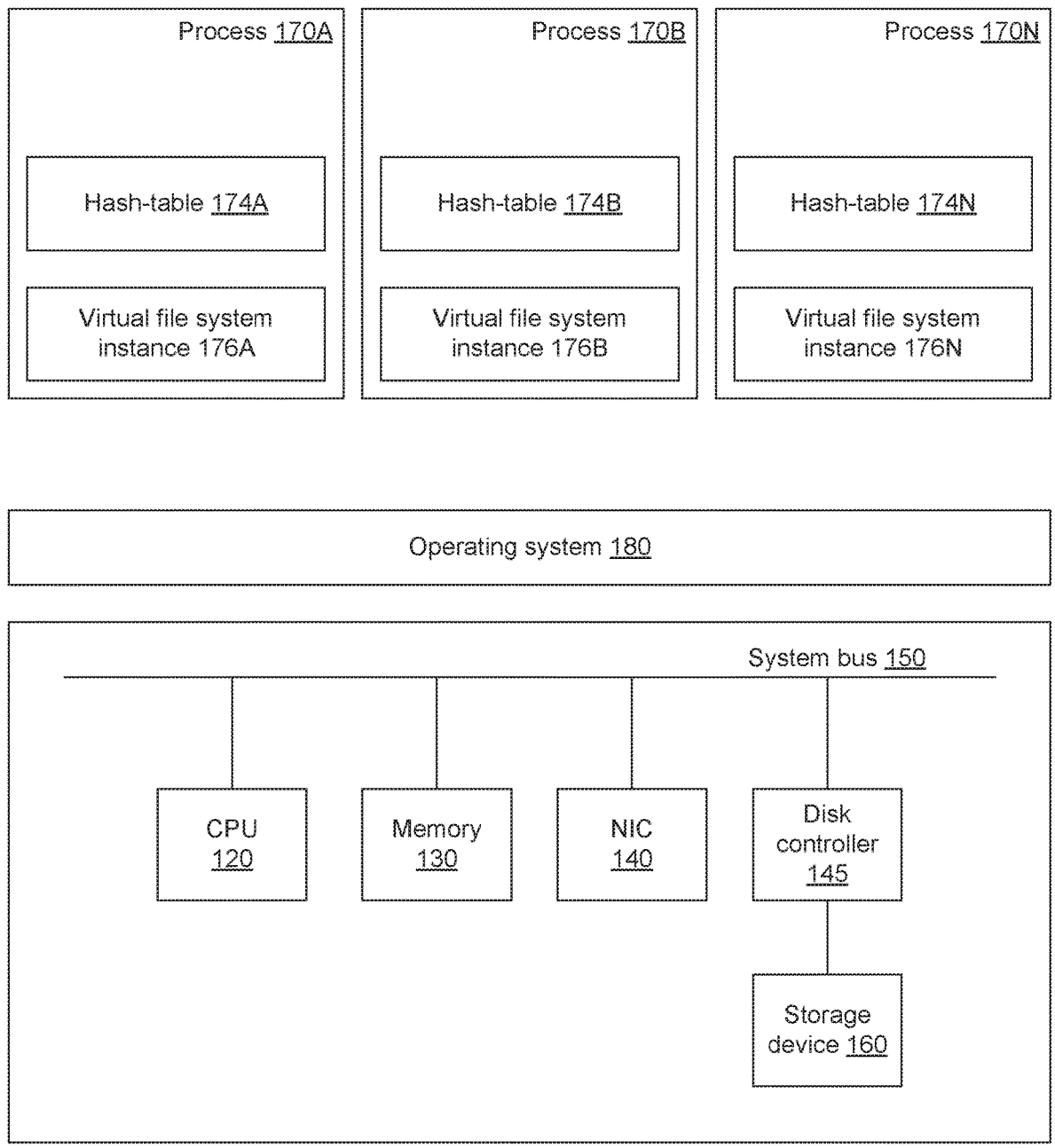
FIG. 1 depicts a high-level component diagram of an example computer system operating in accordance with one or more aspects of the present disclosure.

Described herein are methods and systems for overlay-based file tagging using virtual file systems. In conventional implementations, a virtual file system allows client applications to access different types of file systems (including physical file systems, such as local and network storage devices, as well as pseudo file systems in which the data may be programmatically generated at the runtime rather than retrieved from a storage medium) in a uniform way. Conversely, systems and methods operating in accordance with one or more aspects of the present disclosure, employ a virtual file system overlaid over a base file system (which may be provided by a physical file system, a virtual file system, or a pseudo file system) for efficient association and retrieval of file metadata, which may be stored using a variety of data store implementations, as described in more details herein below.

In both physical and virtual file systems, file system objects (such as files and directories) are commonly identified by respective names. A file system object name may be represented by a character string defining the path to the file system object relative to a certain node within the directory tree that represents the file system object hierarchy. Such a character string may comprise a concatenation of one or more directory names delimited by a certain symbol (such as a forward slash) followed by the file name within the lowest level directory. A fully-qualified file system object name defines the path to the file system object from the root of the directory tree. Conversely, a relative file system object name may define a path to the file system object from an arbitrary intermediate node within the directory tree.

Common file system implementations provide for associating certain metadata items with file system objects. Such metadata items may represent the file system object attributes (such as the file size or file access permissions), creation/access/modification time, etc. However, common file system implementations do not allow creating custom metadata types, such as tags comprising arbitrary binary data and/or character strings, to be associated with arbitrary chosen file system objects. Furthermore, in common file system implementations the metadata retrieval usually requires traversing the directory tree that represents the file system object hierarchy, which may result in the exponential dependence of the computational complexity of the file metadata retrieval on the number of levels in the directory tree.

The present disclosure addresses the above-noted and other deficiencies by providing systems and methods for overlay-based file tagging using virtual file systems. In accordance with one or more aspects of the present disclosure, a virtual file system may be associated with, or overlaid over, a certain node within the directory tree of an existing physical, virtual, or pseudo file system. The overlay virtual file system may allow associating arbitrary metadata items (also referred to as "file tags") with one or more files of the underlying file system. A file tag may comprise a plurality of bits representing bit flags, integer values, and/or character strings.

File tags associated with a plurality of files of a given file system may be stored using one or more files, databases, and/or other data stores in a manner that does not require traversing the directory tree for tag retrieval, thus removing the exponential dependence of the computational complexity of the file tag retrieval on the number of levels in the directory tree. In an illustrative example, file tags associated with a plurality of files of a given file system may be stored in a relational database, which may be indexed by one or more fields, thus allowing for efficient execution of search queries allowing to retrieve all files associated with a given tag value, sort the file identifiers in the ascending or descending order of values of a given tag, retrieve all tags associated with a given file, ascertain whether a given tag value exists, etc.

A physical or virtual file system may be associated with, or "mounted to," a certain node within the directory tree. Such a node is commonly referenced as a "mount point" for the file system. In other words, a mount point is a directory (possibly an empty one) in a currently accessible file system, to which a newly added file system is mounted (i.e., logically attached). The mount point becomes the root directory of the newly added file system.

A virtual file system may be implemented by a class of an object-oriented programming language. Therefore, an instance of the virtual file system may be created by executing a call to a constructor of the class implementing the virtual file system. Parameters of the constructor may include the mount point, the identifier of a data store employed for storing metadata items associated with files of the underlying file system, and a reference to a data structure associating metadata items with files of the underlying file system.

In an illustrative example, such a data structure may be represented by a hash table implemented as an associative array employed for mapping keys (i.e., file identifiers) to values (i.e., metadata items). A hash function of a given key value may be computed to produce an index into an array of slots, in which the corresponding value may be found.

A virtual file system implemented in accordance with one or more aspects of the present disclosure may rely on the underlying file system with respect to performing the legacy file system operations (e.g., file create, open, read, write, etc.). In an illustrative example, responsive to receiving a file operation request with respect to a file residing on a virtual file system, the method of performing file operations in accordance with one or more aspects of the present disclosure may determine whether the requested file operation is a legacy operation implemented by the underlying file system, in which case the request may be forwarded to the underlying file system. Otherwise, the method may identify a virtual file system associated with the file specified by the request, retrieving one or more metadata items associated with the file using a data structure associated with the virtual file system, and return the result to the requesting client, as described in more details herein below.

In certain implementations, a virtual file system may be supported on a per-process or per-thread basis. In other words, multiple processes or threads within the same process may have access to different virtual file systems, thus providing better flexibility to software developers and/or computer system users.

In certain implementations, two or more virtual file systems operating in accordance with one or more aspects of the present disclosures may be overlaid over a fragment of the underlying real file system, virtual file system, or pseudo file system, such that each of such overlay file systems defines one or more file tags for a plurality of files of the underlying file system. Various aspects of the above referenced methods and systems are described in details herein below by way of examples, rather than by way of limitation.

FIG. 1 depicts a high-level component diagram of an example computer system operating in accordance with one or more aspects of the present disclosure. An example computer system 100 may comprise one or more processing devices 120 which may be operatively coupled, via a system bus 150, to one or more memory devices 130 and input/output (I/O) devices including one or more network interface controllers (NICs) 140 and one or more disk controllers 145.

"Processing device" or "processor" herein refers to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

"Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

A network interface controller (NIC) 140 may implement Open Systems Interconnection (OSI) layer 1 (physical layer) and OSI layer 2 (data link layer), thus providing physical access to a networking medium and a low-level addressing system using media access control (MAC) addresses, in order to allow example computer system 100 to communicate over a wired or wireless network (not shown in FIG. 1).

A disk controller 145 may be employed to facilitate communications of processing devices 120 and/or other components of example computer system 100 with one or more data storage devices 160. "Data storage device" herein shall refer to a memory device, such as a disk, RAID array, EEPROM device, or any other device capable of storing data.

Computer system 100 may implement one or more physical, virtual, and/or pseudo file systems. In an illustrative example, a physical file system may utilize one or more data storage devices 160 for storing the files and associated metadata. In another illustrative example, a physical file system may utilize one or more network interface controllers 140 to access data storage devices of remote computer systems. In yet another illustrative example, a virtual file system may provide an abstraction on top of a physical file system in order to allow applications to access local and network storage devices transparently for processes and/or processing threads being executed by computer system 100. In yet another illustrative example, computer system 100 may implement a pseudo file system, in which the data is programmatically generated at the runtime rather than retrieved from a storage medium.

In an illustrative example, computer system 100 may execute a plurality of processes and/or processing threads 170A-170M managed by an operating system 180. Since the differences between a process and a processing thread are operating system-specific and immaterial for the purposes of this disclosure, the term "process" as used herein refers to a single processing thread or to a process comprising one or more processing threads.

Alternatively, computer system 100 may run one or more virtual machines (not shown in FIG. 1), by executing a software layer, often referred to as "hypervisor," above the hardware and below the virtual machines. The hypervisor may abstract the physical layer, including processors, memory, and I/O devices, and present this abstraction to the virtual machines as virtual devices. A virtual machine may execute a plurality of processes and/or processing threads managed by a guest operating system.

As noted herein above, one or more virtual file systems may be supported by computer system 100 on a per-process or per-thread basis, thus providing different processes with access to different virtual file systems. In accordance with one or more aspects of the present disclosure, a process 170 may instantiate a virtual file system object 176 implementing overlay-based file tagging. Process 170 may also maintain a hash table 174 employed for mapping file identifiers to the associated metadata items. While FIG. 1 schematically illustrates each process 170 as maintaining its own copy of the hash table 174, in various other illustrative examples, the data structures may be shared by one or more processes being executed by computer system 100.

Figure 2:
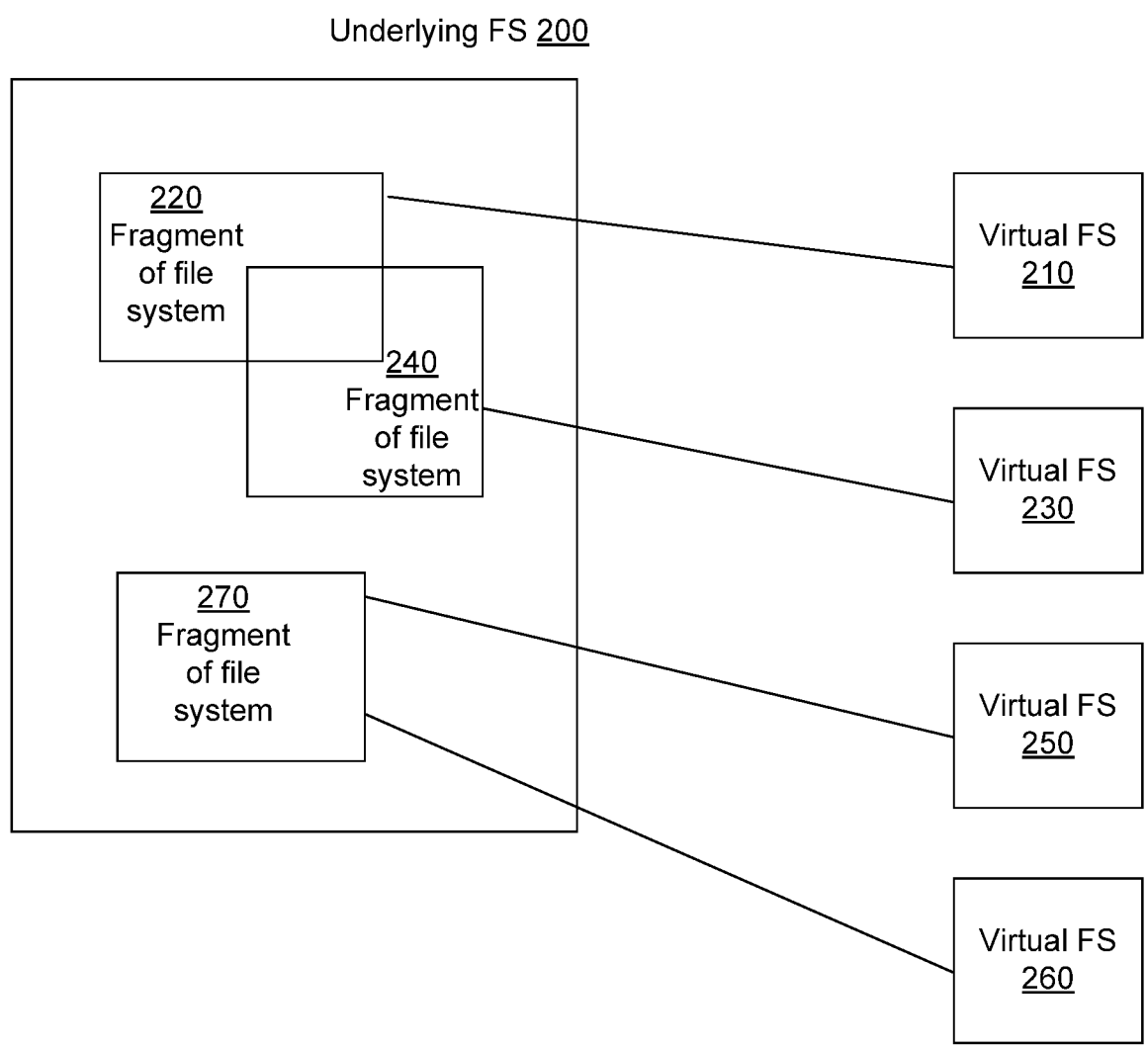
FIG. 2 schematically illustrates examples of multiple virtual file systems being overlaid over one or more intersecting or non-intersecting fragments of the underlying file system, in accordance with one or more aspects of the present disclosure.

In certain implementations, multiple virtual file systems operating in accordance with one or more aspects of the present disclosures may be overlaid over one or more intersecting or non-intersecting fragments of the underlying file system. In various illustrative examples illustrated by FIG. 2, each of such overlay virtual file systems associates one or more file tags with a plurality of files of a corresponding fragment of the underlying file system. As schematically illustrated by FIG. 2, a virtual file system 210 may be associated with a fragment 220 of the underlying file system 200, and a virtual file system 230 may be associated with a fragment 240 of the underlying file system 200, such that the fragments 220 and 240 are intersecting, i.e., have a common subset of files. In another illustrative example, virtual file systems 250 and 260 may be associated with a fragment 270 of the underlying file system 200.

Figure 3:
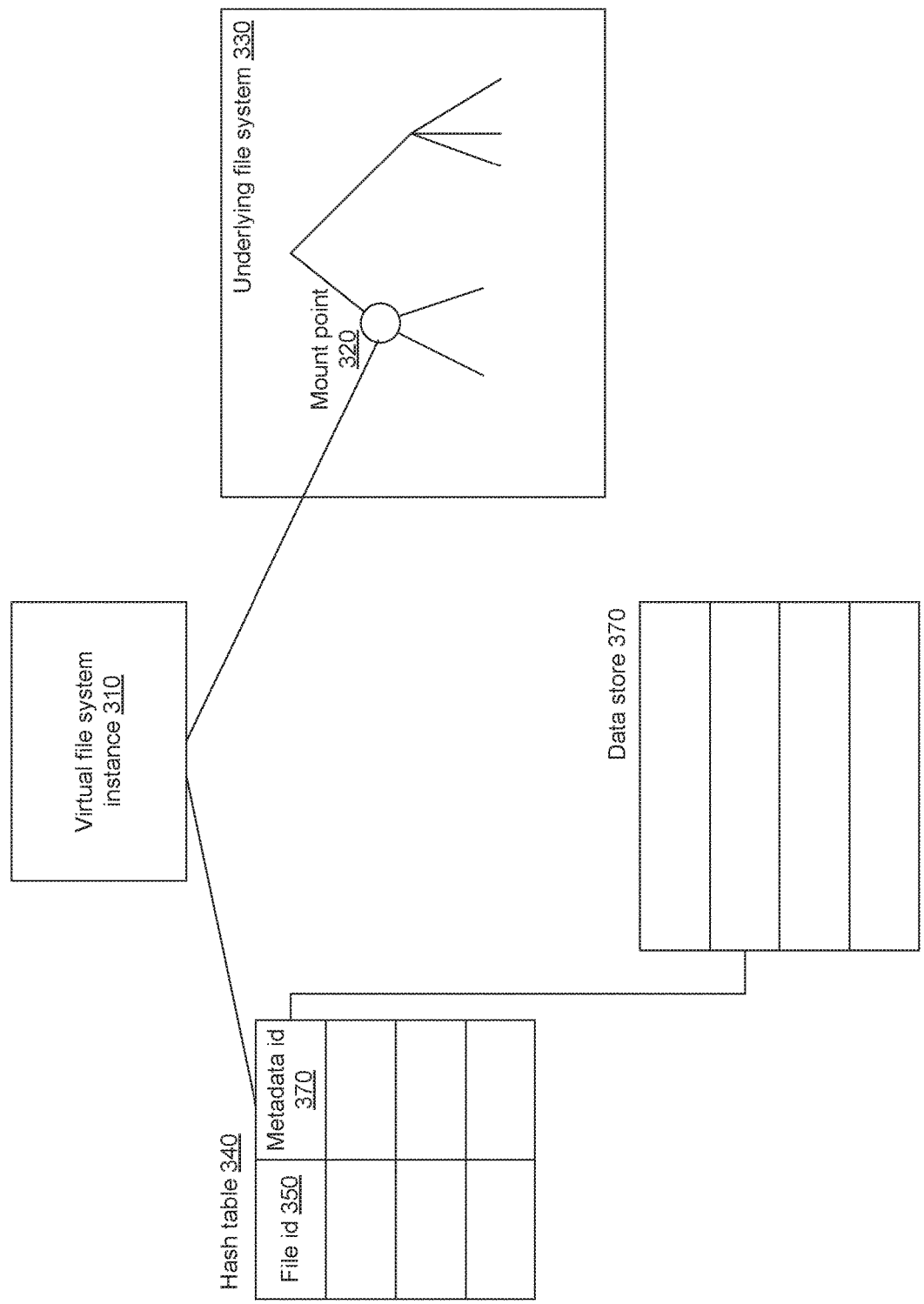
FIG. 3 schematically illustrates objects and data structures employed by example methods of overlay-based file tagging using virtual file systems, in accordance with one or more aspects of the present disclosure.

FIG. 3 schematically illustrates objects and data structures that may be employed for implementing file tagging using overlay virtual file systems in accordance with one more aspects of the present disclosure. A virtual file system may be implemented by a class of an object-oriented programming language. Therefore, an instance 310 of the virtual file system may be created by executing a call to a constructor of the class implementing the virtual file system. Parameters of the constructor may include the mount point, the identifier of a data store employed for storing metadata items associated with files of the underlying file system, and a reference to a data structure associating metadata items with files of the underlying file system.

The mount point 320 may be represented by an arbitrary chosen node within the directory tree representing the file system object hierarchy of the underlying file system 330. Thus, mount point 320 becomes the root directory of virtual file system instance 310.

The data structure associating metadata items with files of the underlying file system may be represented by a hash table 340 implemented as an associative array employed for mapping keys 350 (i.e., file identifiers) to values 360 (i.e., metadata item identifiers in a data store 370).

The metadata items associated with a plurality of files of the underlying file system 350 may be stored using one or more data stores 370 which may be represented by one or more files, block storage devices, relational databases, hierarchical databases, etc. In an illustrative example, a relational database employed for storing the metadata items may be indexed by one or more fields, thus allowing for efficient execution of search queries allowing to retrieve all files associated with a given tag value, sort the file identifiers in the ascending or descending order of values of a given tag, retrieve all tags associated with a given file, ascertain whether a given tag value exists, etc. In another illustrative example, one or more metadata items may be programmatically generated at the runtime rather than retrieved from a storage medium.

Figure 4:
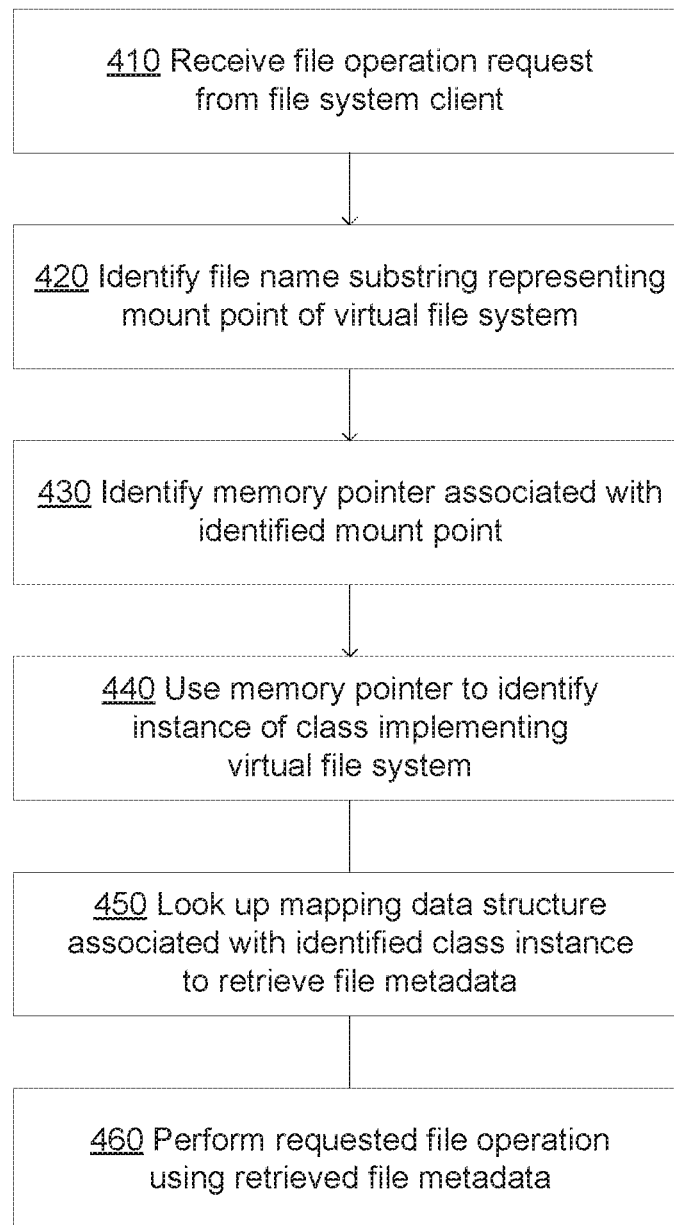
FIGS. 4-5 depict flow diagrams of example methods of overlay-based file tagging using virtual file systems, in accordance with one or more aspects of the present disclosure.

FIG. 4 depicts a flow diagram of an example method 400 of performing file operations using overlay virtual file systems, in accordance with one or more aspects of the present disclosure. Method 400 and/or each of its individual functions, routines, subroutines, or operations may be performed by one or more processing devices of the computer system (e.g., computer system 100 of FIG. 1) executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, a processing device implementing the method may receive, from a file system client, a request to perform a file operation with respect to a file. In addition to legacy file operations, examples of file operations that may be implemented by systems and methods operating in accordance with one or more aspects of the present disclosure include retrieving all files associated with a given tag value, sort the file identifiers in the ascending or descending order of values of a given tag, retrieve all tags associated with a given file, ascertain whether a given tag value exists, etc.

At block 420, the processing device may identify a substring of the file name that represents a mount point of a virtual file system associated with the file. In an illustrative example, the file name may be represented by a character string comprising one or more directory names delimited by a certain symbol (such as a forward slash) followed by the file name within the lowest level directory. A relative file name defining a path to the file from an arbitrary intermediate node within the directory tree may be converted to a fully-qualified file name defining the path to the file from the root of the directory tree. The processing device may parse the fully-qualified file name and compare each sub-directory with a list of mount points of currently defined virtual file systems.

Responsive to identifying a matching entry on the list mount points of currently defined virtual file systems, the processing device may, at block 430, retrieve a memory pointer associated with the mount point. In an illustrative example, the processing device may maintain a memory data structure mapping mount point identifiers to the respective memory pointers identifying instances of classes implementing virtual file systems.

At block 440, the processing device may identify, using the retrieved memory pointer, an instance of a class implementing the virtual file system associated with the identified mount point. In an illustrative example, the processing device may instantiate the identified class by executing a call to a constructor of the identified class. Parameters of the constructor may include the mount point, the identifier of a data store employed for storing metadata items associated with files of the underlying file system, and a reference to a memory data structure associating metadata items with files of the underlying file system. In various illustrative examples, the underlying file system may be represented by a real file system, a virtual file system, or a pseudo file system.

At block 450, the processing device may look up the memory data structure associating metadata items with files to identify and retrieve, from the data store, one or more metadata items associated with the specified file. A metadata item may, in various illustrative examples, be represented by a bit sequence, an integer value, or a character string, as described in more details herein above. In an illustrative example, the memory data structure associating metadata items with files may be implemented by a hash table comprising a plurality of records for mapping keys (i.e., file identifiers) to values (i.e., metadata item identifiers in a data store). The data store may be implemented by one or more files, block storage devices, relational databases, hierarchical databases, etc. Alternatively, one or more metadata items may be programmatically generated at the runtime rather than retrieved from a storage medium, as described in more details herein above.

At block 460, the processing device may perform the requested file operation using the retrieved metadata items and return the operation result to the requesting client. In an illustrative example, the file operation may involve retrieving all files associated with a given tag value. In another illustrative example, the file operation may involve sorting the file identifiers in the ascending or descending order of values of a given tag. In yet another illustrative example, the file operation may involve retrieving all tags associated with a given file. In yet another illustrative example, the file operation may involve ascertaining whether a given tag value exists. In yet another illustrative example, the file operation may involve performing a legacy file operation implemented by the underlying file system (such as file create, open, read, write, etc., in which case the request may be forwarded to the underlying file system. Responsive to completing the operations referenced by block 460, the method may terminate.

Figure 5:
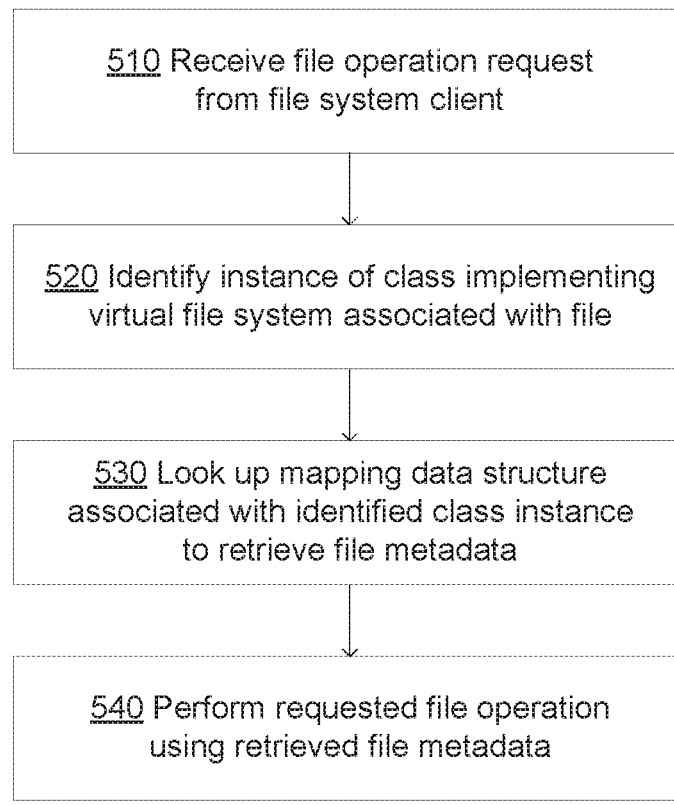

FIG. 5 depicts a flow diagram of an example method 500 of performing file operations using overlay virtual file systems, in accordance with one or more aspects of the present disclosure. Method 500 and/or each of its individual functions, routines, subroutines, or operations may be performed by one or more processing devices of the computer system (e.g., computer system 100 of FIG. 1) executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

At block 510, a processing device implementing the method may receive, from a file system client, a request to perform a file operation with respect to a file. In addition to legacy file operations, examples of file operations that may be implemented by systems and methods operating in accordance with one or more aspects of the present disclosure include retrieving all files associated with a given tag value, sort the file identifiers in the ascending or descending order of values of a given tag, retrieve all tags associated with a given file, ascertain whether a given tag value exists, etc.

At block 520, the processing device may identify, using the retrieved memory pointer, an instance of a class implementing the virtual file system associated with the identified mount point. In an illustrative example, identifying the class instance may involve identifying a substring of the file name that represents a mount point of a virtual file system associated with the file, and retrieving, from a memory data structure mapping mount point identifiers to the respective memory pointers, a memory pointer associated with the identified mount point, as described in more details herein above.

At block 530, the processing device may identify a memory data structure which is associated with the identified class instance and is employed for mapping metadata items to file identifiers. The processing device may then look up the memory data structure associating metadata items with files to identify and retrieve, from the data store, one or more metadata items associated with the specified file, as described in more details herein above.

At block 540, the processing device may perform the requested file operation using the retrieved metadata items and return the operation result to the requesting client, as described in more details herein above. Responsive to completing the operations referenced by block 540, the method may terminate.

Figure 6:
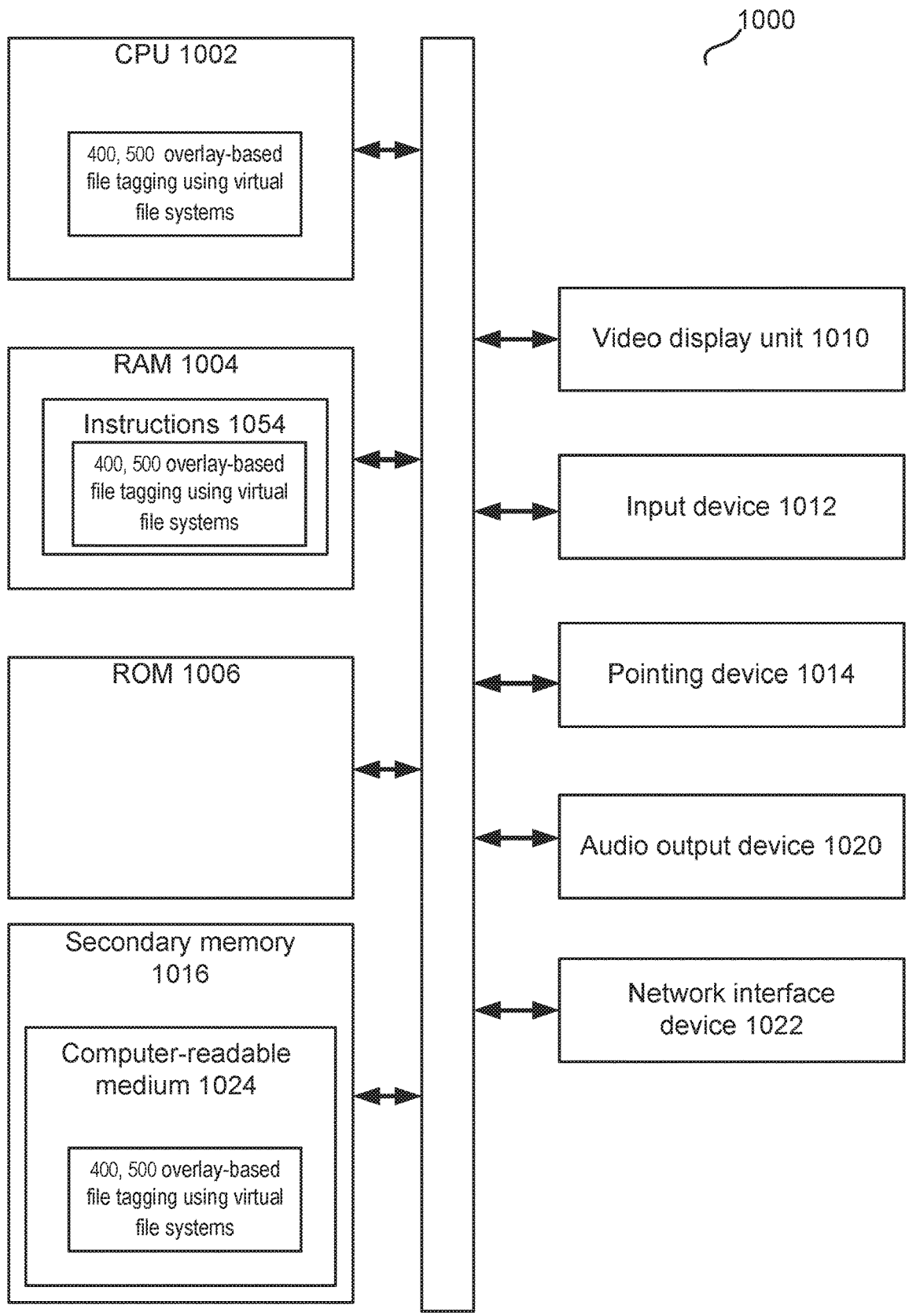
FIG. 6 depicts a high-level component diagram of an example computer system operating in accordance with one or more aspects of the present disclosure.

FIG. 6 depicts a high-level component diagram of an example computer system operating in accordance with one or more aspects of the present disclosure. In various illustrative examples, computer system 1000 may correspond to computer system 100 of FIG. 1.

In one example, computer system 1000 may be connected (e.g., via a network, such as a Local Area Network (LAN), an intranet, an extranet, or the Internet) to other computer systems (e.g., other nodes). Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may include a processor 1002, a volatile memory 1004 (e.g., random access memory (RAM)), a non-volatile memory 1006 (e.g., read-only memory (ROM) or electrically-erasable programmable ROM (EEPROM)), and a storage memory 1016 (e.g., a data storage device), which may communicate with each other via a bus 1008.

Processor 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

In an illustrative example, secondary memory 1016 may include a tangible computer-readable storage medium 1024 on which may be stored instructions 1054 implementing methods 400 and/or 500 of overlay-based file tagging using virtual file systems in accordance with one or more aspects of the present disclosure. Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and/or 500 or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method, comprising:
   receiving, from a file system client, a request to perform a file operation with respect to a file referenced by a file name, wherein the file name comprises one or more directory names and a name of the file in a lowest level directory;
   identifying, by a processing device, a part of the file name, wherein the part of the file name represents a mount point of a virtual file system associated with the file;
   identifying, using a memory pointer associated with the mount point, a class implementing the virtual file system;
   creating an instance of the virtual file system by invoking a constructor of the class, wherein a parameter of the constructor identifies a hash table comprising a plurality of records, each record associating a file identifier with a metadata item;
   retrieving, using the hash table, metadata associated with the file; and
   performing the file operation using the metadata associated with the file.

2. The method of claim 1, further comprising: forwarding a result of the file operation to the file system client.

3. The method of claim 1, wherein the metadata item comprises at least one of: a bit sequence, an integer value, or a character string.

4. The method of claim 1, wherein performing the file operation further comprises forwarding the metadata to the file system client.

5. The method of claim 1, wherein performing the file operation further comprises forwarding the request to an underlying file system associated with the virtual file system.

6. The method of claim 5, wherein the underlying file system is provided by one of: a real file system, a virtual file system, or a pseudo file system.

7. The method of claim 1, wherein performing the file operation comprises identifying a plurality of files associated with a specified metadata value.

8. The method of claim 1, wherein performing the file operation comprises sorting a plurality of file identifiers in a specified order of values of a given metadata item.

9. A non-transitory computer-readable storage medium comprising executable instructions that, when executed by a processing device, cause the processing device to:
   receive, from a file system client, a request to perform a file operation with respect to a file referenced by a file name, wherein the file name comprises one or more directory names and a name of the file in a lowest level directory;
   identify, by the processing device, a part of the file name, wherein the part of the file name represents a mount point of a virtual file system associated with the file;
   identify, using a memory pointer associated with the mount point, a class implementing the virtual file system;
   create an instance of the virtual file system by invoking a constructor of the class, wherein a parameter of the constructor identifies a hash table comprising a plurality of records, each record associating a file identifier with a metadata item;
   retrieve, using the hash table, metadata associated with the file.

10. The method of claim 1, wherein a second parameter of the constructor identifies a data store employed for storing the metadata item.

11. The method of claim 1, wherein the virtual file system is associated with a first processing thread of a process, and wherein a second processing thread of the process is associated with a second virtual file system.

12. The method of claim 1, wherein the hash table is exclusively associated with a process executed by the processing device.

13. The method of claim 1, wherein the hash table is shared by a plurality of processes executed by the processing device.

14. A system, comprising:
a memory; and
a processing device, operatively coupled to the memory, wherein the processing device is configured to:
  receiving, from a file system client, a request to perform a file operation with respect to a file associated with a virtual file system;
  identify, using a memory pointer associated with a mount point of the virtual file system, a class implementing a virtual file system associated with the file;
  create an instance of the virtual file system by invoking a constructor of the class, wherein a parameter of the constructor identifies a hash table comprising a plurality of records, each record associating a file identifier with a metadata item;
  retrieve, using the hash table, metadata associated with the file; and
  perform the file operation using the metadata associated with the file.

15. The system of claim 14, wherein the metadata item comprises at least one of: a bit sequence, an integer value, or a character string.

16. The system of claim 14, wherein the processing device is further to forward the request to an underlying file system associated with the virtual file system.

17. The system of claim 16, wherein the underlying file system is provided by one of: a real file system, a virtual file system, or a pseudo file system.

18. The non-transitory computer-readable storage medium of claim 9, wherein performing the file operation further comprises forwarding the metadata to the file system client.

19. The non-transitory computer-readable storage medium of claim 18, further comprising executable instructions that, when executed by a processing device, cause the processing device to:
  perform the file operation using the metadata associated with the file.

20. The non-transitory computer-readable storage medium of claim 18, wherein the metadata item comprises at least one of: a bit sequence, an integer value, or a character string.

* * * * *